(12) United States Patent
Kauh

(10) Patent No.: US 11,599,202 B2
(45) Date of Patent: Mar. 7, 2023

(54) INPUT DEVICE FOR COMPUTER

(71) Applicant: Ye Woon Kauh, Seoul (KR)

(72) Inventor: Ye Woon Kauh, Seoul (KR)

( * ) Notice: Subject to any disclaimer, the term of this patent is extended or adjusted under 35 U.S.C. 154(b) by 0 days.

(21) Appl. No.: 17/414,553

(22) PCT Filed: Jun. 12, 2019

(86) PCT No.: PCT/KR2019/007091
§ 371 (c)(1),
(2) Date: Jun. 16, 2021

(87) PCT Pub. No.: WO2020/130248
PCT Pub. Date: Jun. 25, 2020

(65) Prior Publication Data
US 2022/0011873 A1 Jan. 13, 2022

(30) Foreign Application Priority Data

Dec. 21, 2018 (KR) .................. 10-2018-0167455
Jun. 11, 2019 (KR) .................. 10-2019-0068866

(51) Int. Cl.
G06F 3/02 (2006.01)
G06F 3/03 (2006.01)
G06F 3/0354 (2013.01)
G06F 3/0362 (2013.01)

(52) U.S. Cl.
CPC .......... *G06F 3/0202* (2013.01); *G06F 3/0312* (2013.01); *G06F 3/0362* (2013.01); *G06F 3/03543* (2013.01)

(58) Field of Classification Search
CPC .. G06F 3/0202; G06F 3/0312; G06F 3/03543; G06F 3/0362
See application file for complete search history.

(56) References Cited

U.S. PATENT DOCUMENTS

| 5,268,674 | A | * | 12/1993 | Howard | G06F 3/03543 200/332 |
| 5,585,823 | A | * | 12/1996 | Duchon | G06F 3/03543 345/157 |
| 5,912,661 | A | * | 6/1999 | Siddiqui | G01D 5/2451 345/157 |
| 10,318,021 | B2 | | 6/2019 | Hayashi | |
| 2002/0075164 | A1 | * | 6/2002 | Iizuka | G06F 3/0486 345/158 |

(Continued)

FOREIGN PATENT DOCUMENTS

| JP | 2017-079049 A | 4/2017 |
| KR | 10-2001-0081773 A | 8/2001 |

(Continued)

OTHER PUBLICATIONS

International Search Report from WIPO in Application No. PCT/KR2019/007091 dated Sep. 19, 2019; 4 pages.

(Continued)

*Primary Examiner* — Ariel A Balaoing
(74) *Attorney, Agent, or Firm* — Dilworth IP, LLC

(57) ABSTRACT

An input device for a computer, wherein the input device eliminates the impacts caused by sudden stops during the pressing of a button portion provided on the input device for a computer, and thereby prevents a user's fingers and wrists from being strained.

10 Claims, 19 Drawing Sheets

(56) References Cited

U.S. PATENT DOCUMENTS

| | | | | |
|---|---|---|---|---|
| 2006/0284844 | A1* | 12/2006 | Yen | G06F 3/03543 |
| | | | | 345/163 |
| 2007/0120823 | A1* | 5/2007 | Otsuka | G06F 3/038 |
| | | | | 345/156 |
| 2011/0279371 | A1* | 11/2011 | Ma | G06F 3/03543 |
| | | | | 345/163 |
| 2012/0001850 | A1 | 1/2012 | Li | |
| 2013/0321272 | A1* | 12/2013 | Deng | G06F 3/0362 |
| | | | | 345/163 |
| 2018/0157345 | A1* | 6/2018 | Wang | G06F 3/0383 |
| 2018/0166228 | A1 | 6/2018 | Chen | |
| 2022/0083161 | A1* | 3/2022 | Hughes | G02B 6/0088 |

FOREIGN PATENT DOCUMENTS

| | | |
|---|---|---|
| KR | 10-2002-0000372 A | 5/2002 |
| KR | 20-0276574 B1 | 5/2002 |
| KR | 10-1400707 B1 | 5/2014 |

OTHER PUBLICATIONS

Extended European Search Report issued in European Patent Application No. 19898334.8, dated Nov. 25, 2022, 10 pages.

\* cited by examiner

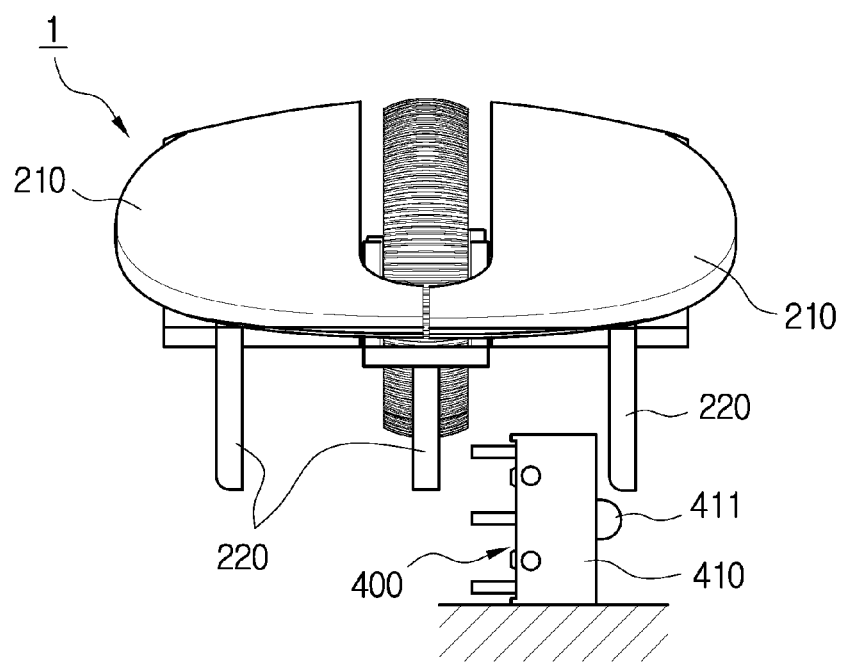
FIG. 7
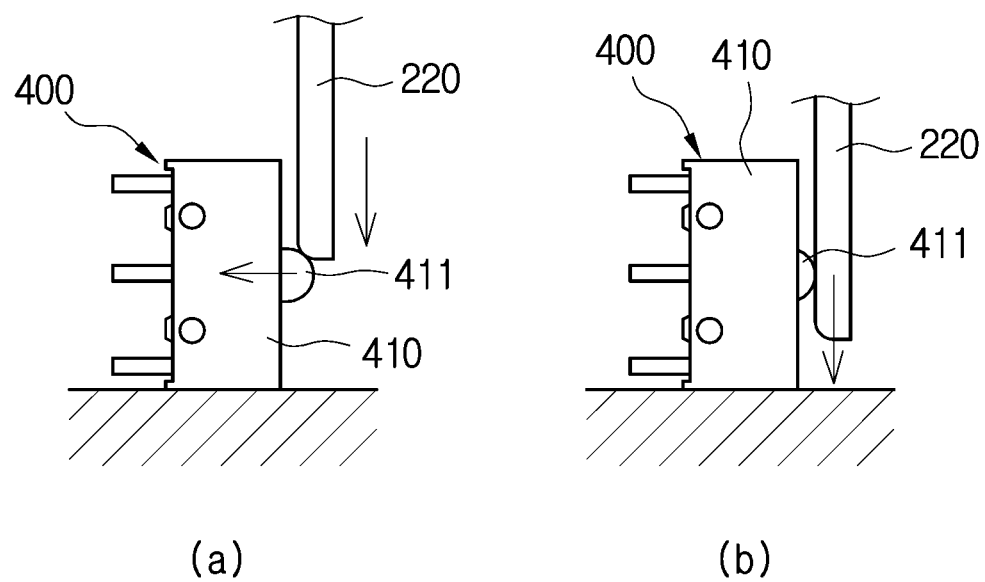
(a)                                (b)
FIG. 8A                 FIG. 8B

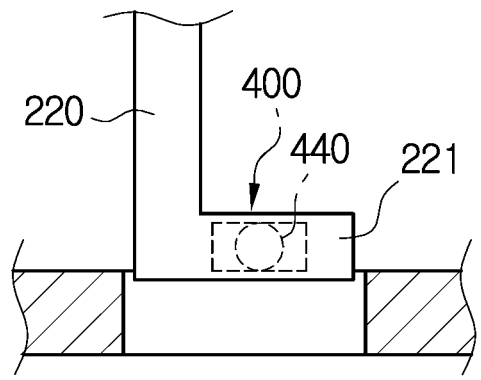
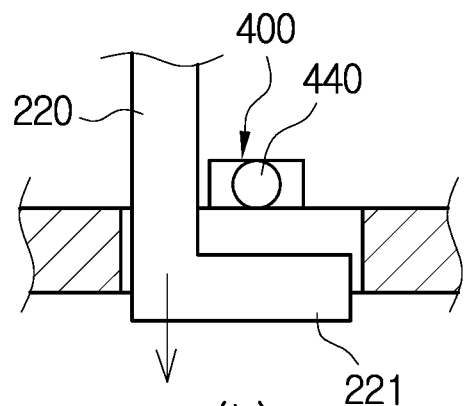
FIG. 11A  FIG. 11B
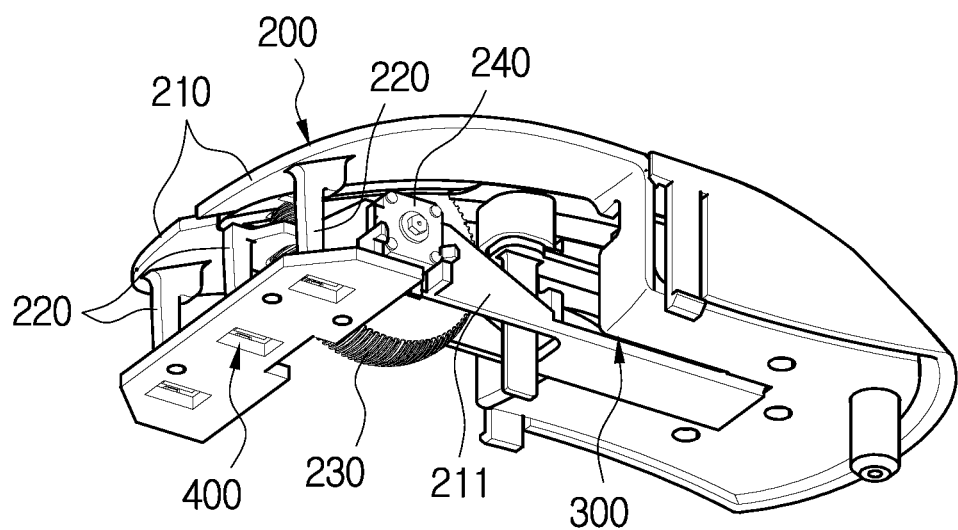
FIG. 12

(a)　　　　　　　　　　　　(b)

(a)          (b)

INPUT DEVICE FOR COMPUTER

TECHNICAL FIELD

The present disclosure relates to an input device for a computer, and more particularly, to an input device for a computer, which does not put stress on the fingers and wrist of a user when the input device for a computer is used.

BACKGROUND OF THE INVENTION

In general, a computer input device includes a variety of types, such as a mouse, a keyboard, and a joystick.

Among them, the mouse is formed of a round and small body covered by a palm, and is equipped with a long cable connected to a computer. A wireless product not having a cable has recently been released.

Such a mouse, together with a keyboard, is publicly used a lot so far in such a relatively simple way in which a cursor on a display screen moves and an instruction is executed when a button is clicked on.

However, as the time to use the mouse is increased gradually, there is concern that a carpal tunnel syndrome may occur due to the tension of the fingers and wrist of a user.

For reference, the carpal tunnel syndrome is one of repetitive strain injuries, and refers to damage occurring in hands, wrists, shoulders, etc. when a repetitive task is performed in a tension state for a long time, such as a task using a computer keyboard or mouse (hereinafter referred to as a "computer input device"). For example, the carpal tunnel syndrome may include a symptom in which there is a pain in the wrists, shoulders, a waist, etc. when typing is performed in an incorrect posture for a long time.

Conventionally, prior applications such as Korean Patent No. 10-1400707 (published on May 29, 2014), etc. were filed with respect to a computer input device capable of preventing such a symptom.

Specifically, the conventional computer input device has a body formed in a spherical form. The computer input device enables an input button to be manipulated in the state in which a user hold the body with his/her hand as if the user holds a ball in his/her hand in the state in which the user relaxes and naturally bends his/her fingers.

However, in the conventional computer input device, a mechanical microswitch is commonly applied to the input button. The state of such an input button becomes an "ON" state as the mechanical microswitch is pressed when the input button is clicked on, and simultaneously the input button is suddenly stopped. Accordingly, an impact is applied to the fingers and wrist of a user.

In particular, if a drag task is performed in the state in which the input button of the computer input device is clicked on, there is concern that a muscle may be tensed because a user clicks on the input button while unconsciously applying an unnecessary force thereto.

SUMMARY OF THE INVENTION

The present disclosure has been made to solve the aforementioned problems, and an object of the present disclosure is to provide an input device for a computer, which does not put stress on the fingers and wrist of a user by eliminating an impact attributable to a sudden stop when the button unit provided in the input device for a computer is clicked on.

An input device for a computer according to the present disclosure for implementing the aforementioned object includes a main body unit having a receiving space provided therein, a button unit provided at the top of the main body unit so as to be clickable, an elastic unit configured to restore the button unit to its original state when clicking on the button unit is released, and a switch unit provided within the receiving space and subjected to an on/off operation depending on whether the button unit is clicked on. The button unit may further move by a given depth in the state in which the switch unit maintains the ON operation after being subject to the ON operation.

In this case, the main body unit may include an upper casing and a lower casing separated from and assembled to each other, and the button unit may be formed by cutting a part of the upper casing or a separate button member may be coupled to an opening of the upper casing.

Furthermore, a manipulation bar for ON/OFF operating the switch unit may protrude downward on an inner circumference surface of the button unit.

Furthermore, the elastic unit may use an elastic restoring force of the button unit formed in a cantilever shape.

Furthermore, the switch unit may include a microswitch equipped with a contact type button which comes into contact with the bottom of the manipulation bar lowered when the button unit is clicked on and is downward pressed, and an elastic member interposed between the bottom of the microswitch and a bottom within the main body unit and configured to upward and elastically support the microswitch.

Furthermore, the switch unit may include a microswitch equipped with a contact type button which comes into sliding contact with an outer circumference surface on the lower side of the manipulation bar lowered when the button unit is clicked on and is pressed in a horizontal direction orthogonal to a direction in which the manipulation bar is lowered.

Furthermore, the switch unit may include an optical transmitter configured to generate a light beam and an optical receiver disposed to face the optical transmitter and configured to receive the light beam generated by the optical transmitter. When the button unit is not clicked on, a covering member at the bottom of the manipulation bar may maintain an OFF state by blocking a light beam between the optical transmitter and the optical receiver. When the button unit is clicked on, the covering member may change the OFF state into an ON state by releasing the blocking of the light beam between the optical transmitter and the optical receiver.

Furthermore, the switch unit may include an optical transmitter configured to generate a light beam and a first optical receiver disposed to face the optical transmitter and configured to receive the light beam generated by the optical transmitter. When the button unit is not clicked on, the first optical receiver may maintain an OFF state by receiving the light beam generated by the optical transmitter. When the button unit is clicked on, a lower end of the manipulation bar may block the light beam, so that the OFF state is changed to an ON state.

Furthermore, the switch unit may further include a second optical receiver disposed on one side of the optical transmitter and configured to receive a light beam of the optical transmitter which is reflected from a surface of the manipulation bar at a moment when the lower side of the manipulation bar blocks the light beam between the optical transmitter and the first optical receiver so that the OFF state is changed to the ON state when the button unit is clicked on. The manipulation bar may be formed in a wedge shape having a wide top and narrow bottom, and may convert, into a given signal, the amount of reflection of a light beam according to reflection distances of the light beam, differently formed depending on a degree to which the manipulation bar is lowered, through a control unit. The given signal may be used as analog input means within a computer.

Furthermore, analog information through the analog input means may be used as a drawing tool including a pen, a paint brush or a calligraphy brush capable of expressing different thicknesses on a computer display.

Furthermore, the switch unit may further include a power blocking unit configured to block the supply of power when the switch unit is not used for a given time.

Furthermore, the switch unit may further include an operation check unit configured to generate vibration or a sound when the switch unit is subjected to an ON/OFF operation in response to clicking on the button unit.

Furthermore, at least one of a plurality of button members constituting the button unit includes a mouse wheel rotatably coupled to the at least one button member and an encoder configured to sense the rotation of a wheel member. The button member equipped with the mouse wheel and the encoder may be integrally raised or lowered.

Furthermore, any one of a mechanical type or an optical type may be applied to the encoder.

Furthermore, the button unit may be formed in a cantilever shape. The switch unit may be disposed between a fixed stage of the button unit and a free stage of the button unit which is a point clicked on with a finger.

Furthermore, the switch unit may be a microswitch equipped with a contact type button which comes into contact with the bottom of the button unit when the button unit is clicked on and is downward pressed.

Furthermore, the button unit may include a first section which is an isolated distance between the fixed stage and the contact type button and a second section which is an isolated distance between the contact type button and the free stage.

The second section may be formed to be longer than the first section.

Furthermore, given stiffness may be imparted to the button unit by applying different thicknesses to the first section and the second section.

Furthermore, the button unit may include a left button, a right button disposed on the right side of the left button in parallel thereto, and a middle wheel button disposed between the left button and the right button in parallel thereto.

Furthermore, the middle wheel button may include a wheel member installed to be rotatable through a rotation shaft within an installation hole formed near the free stage and having a plurality of optical slits radially formed around the rotation shaft and penetrating the wheel member, an optical transmitter installed at the bottom of the middle wheel button so as to be isolated from the wheel member on one side of the wheel member, and configured to generate a light beam, and an optical receiver installed at the bottom of the middle wheel button so as to face the optical transmitter on the other side of the wheel member and configured to receive a light beam passing through the optical slits after being generated by the optical transmitter.

Furthermore, the first section of the middle wheel button may have a thickness greater than those of the left button and the right button in order to have stiffness greater than those of the left button and the right button.

The present disclosure according to the aforementioned construction can prevent an impact from being applied to the fingers and wrist of a user who manipulates the button unit because the manipulation bar can further move downward by a given depth without being suddenly stopped even after the manipulation bar performs an ON operation on the switch unit when the button unit provided in the input device is clicked on.

Accordingly, there is an advantage in that the fingers and wrist of the user can be protected because a tension does not occur in a hand with which the user holds the input device.

BRIEF DESCRIPTION OF DRAWINGS

FIG. 7 is a front view of the switch unit according to the second embodiment of the present disclosure.

FIGS. 8A and 8B are operating state diagrams of the switch unit according to the second embodiment of the present disclosure.

FIGS. 11A and 11B are cross-sectional views taken along line I-I in FIG. 10, illustrating an operating state of the switch unit according to the third embodiment of the present disclosure.

FIGS. 12 and 13 are perspective views illustrating an installation structure of an encoder according to an embodiment of the present disclosure.

DESCRIPTION OF REFERENCE NUMERALS

Figure 1:
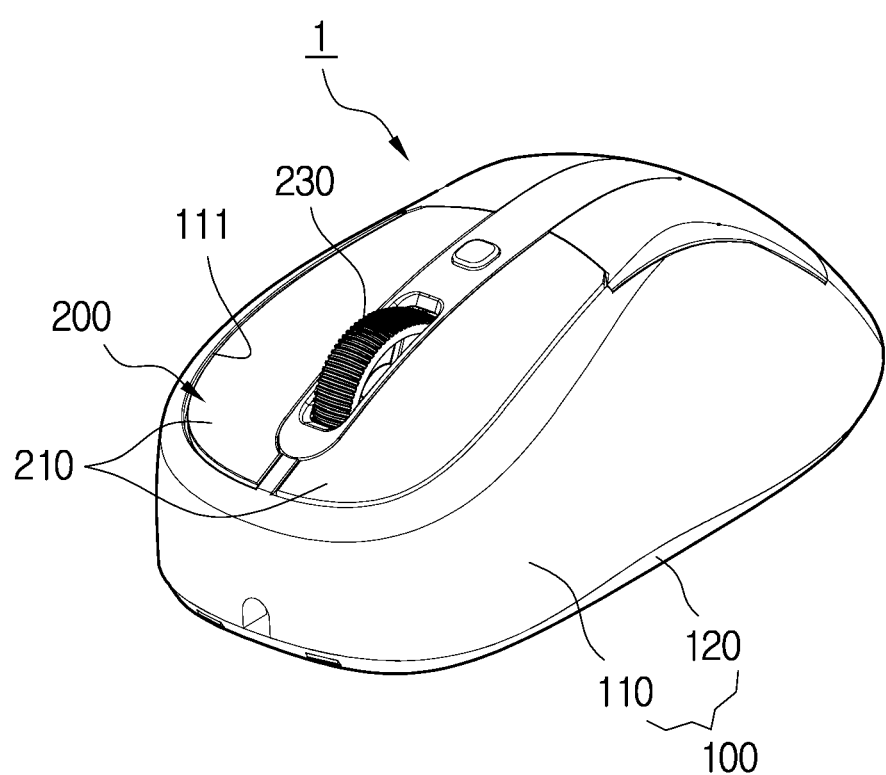
FIG. 1 is a perspective view of an input device for a computer according to the present disclosure.

1: input device for a computer
100: main body unit
110: upper casing
111: opening
120: lower casing
200: button unit
210: button member
220: manipulation bar
221: covering member
230: mouse wheel
300: elastic unit
400: switch unit
410: microswitch
411: contact type button
420: elastic member
430: optical transmitter
440: optical receiver
450: first optical receiver
460: second optical receiver
470: power blocking unit
480: operation check unit
481: vibrator
483: speaker

DETAILED DESCRIPTION OF THE INVENTION

Hereafter, constructions and operations according to detailed embodiments of the present disclosure are described in detail with reference to the accompanying drawings.

In this case, in adding reference numerals to the components of each drawing, it should be noted that the same components have the same reference numerals if possible even if they are displayed in different drawings.

Figure 2:
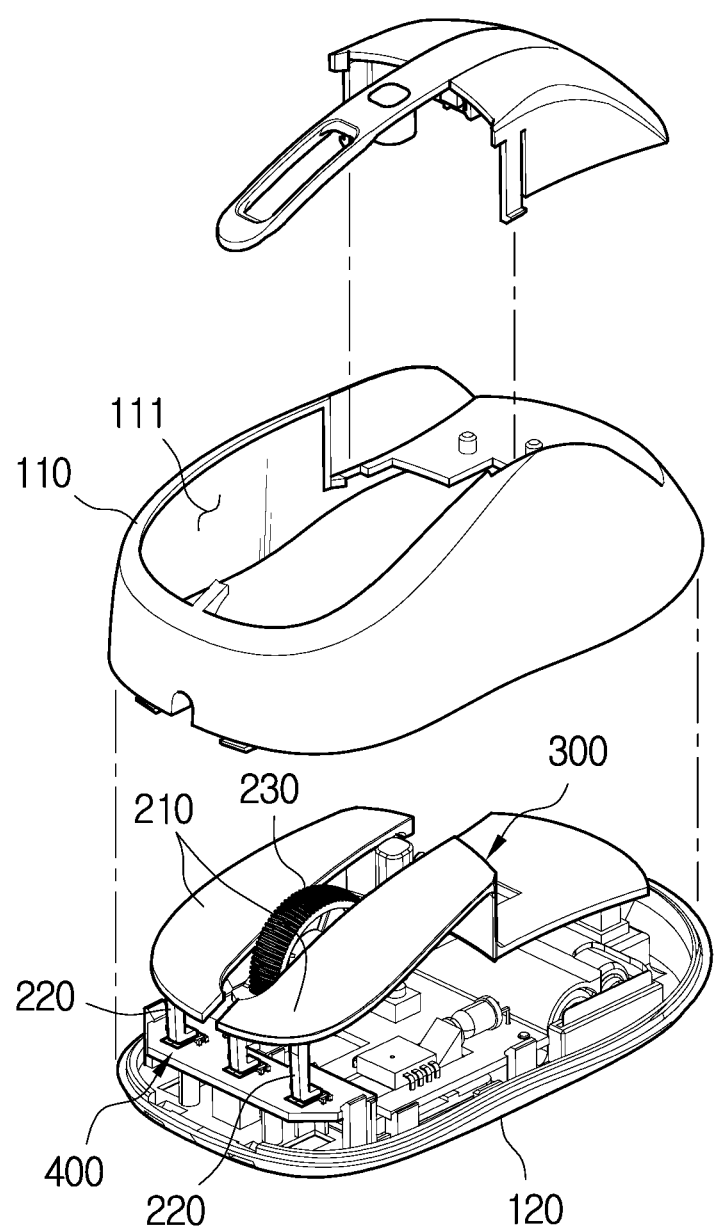
FIG. 2 is an exploded perspective view of the input device for a computer according to the present disclosure.

FIG. 1 is a perspective view of an input device for a computer according to the present disclosure. FIG. 2 is an exploded perspective view of the input device for a computer according to the present disclosure.

Referring to FIGS. 1 and 2, an input device 1 for a computer according to the present disclosure includes a main body unit 100, a button unit 200, an elastic unit 300, and a switch unit 400.

According to the present disclosure, the button unit may be clicked on by a given depth without a sudden stop even after the switch unit is subjected to an ON operation when the button unit 200 is clicked on. Accordingly, stress can be prevented from being applied to the fingers and wrist of a user.

A construction of the present disclosure is specifically described as follows.

First, the main body unit 100 constructs a main body of the input device 1 for a computer, and includes an upper casing 110 and a lower casing 120 separated from and assembled to each other so that a receiving space can be provided therein.

The main body unit 100 may be formed in various forms depending on the type of input device 1 for a computer. That is, the input device 1 for a computer may be applied to various types, such as a mouse, a keyboard, and a joystick, and thus the main body unit 100 may be changed in various shapes. In this case, in a preferred embodiment of the present disclosure, a case where the input device 1 for a computer is applied to a mouse for a computer is first taken as an example and described.

The button unit 200 ON/OFF operates the switch unit 400 to be described later depending on whether the button unit 200 is clicked on. Such a button unit 200 may have a plurality of button members 210, preferably, at least two button members 210 disposed in parallel on the left and right sides and clickable on the upper casing 110 that constructs the upper part of the main body unit 100.

Specifically, the button unit 200 may be formed by cutting a part of the upper casing 110 or may be formed such that a separate button member 210 is coupled to an opening 111 of the upper casing 110. In the present disclosure, a case where the button unit 200 is coupled as a separate button member 210 is taken as an example and described.

In this case, a manipulation bar 220 for ON/OFF operating the switch unit 400 protrudes downward by a given length on the inner circumference surface of the button unit 200. An operation of such a manipulation bar 220 is specifically described along with the switch unit 400 to be described later.

Furthermore, a mouse wheel 230 capable of performing a scroll function for scrolling up/down a screen of the Internet or a document on a monitor may be provided in at least one of the plurality of button members 210.

Specifically, the mouse wheel 230 may be rotatably coupled to another button member 211 provided between the two button members 210.

Another manipulation bar 220 may be provided on the lower side of the button member 211 to which the mouse wheel 230 is coupled. Accordingly, when the mouse wheel 230 is clicked on in addition to the rotation of the mouse wheel 230, the manipulation bar 220 may perform a corresponding function by ON/OFF operating the switch unit 400 to be described later.

Furthermore, an encoder 240 (refer to FIG. 4) for detecting a rotation state of the mouse wheel 230 and transmitting an input signal corresponding thereto may be provided in the mouse wheel 230. The encoder 240 may be coupled to the mouse wheel 230 so as to be raised or lowered integrally with the mouse wheel 230. Accordingly, when the mouse wheel 230 is clicked on, a distance in which the mouse wheel 230 is raised or lowered can be increased compared to a conventional mouse wheel.

An operation of the mouse wheel 230 including such an encoder 240 is specifically described along with the switch unit 400 to be described later.

The elastic unit 300 functions to restore the button unit 200 to its original state when clicking on the button unit 200 is released.

Specifically, the elastic unit 300 may use the elastic restoring force of the button unit 200 formed in a cantilever shape. It is preferred that such a button unit 200 is made of a synthetic resin material so that the elastic unit 300 can generate an efficient elastic restoring force.

In this case, in the present disclosure, a case where the elastic unit 300 uses the structural characteristic (cantilever) of the button unit 200 is illustrated and described as an example, but the present disclosure is not limited thereto. The elastic unit 300 may be variably changed and applied as long as the elastic unit 300 smoothly restores the button unit 200 to its original state when clicking on the button unit 200 is released. For example, the elastic unit 300 may be changed to an elastic unit including an elastic spring (not illustrated) configured to upward and elastically support the manipulation bar 220.

The switch unit 400 is subjected to an ON/OFF operation depending on whether the button unit 200 is clicked on. Such a switch unit 400 may be applied as various embodiments within the receiving space of the main body unit 100 as in first and fourth embodiments to be described later.

Figure 3:
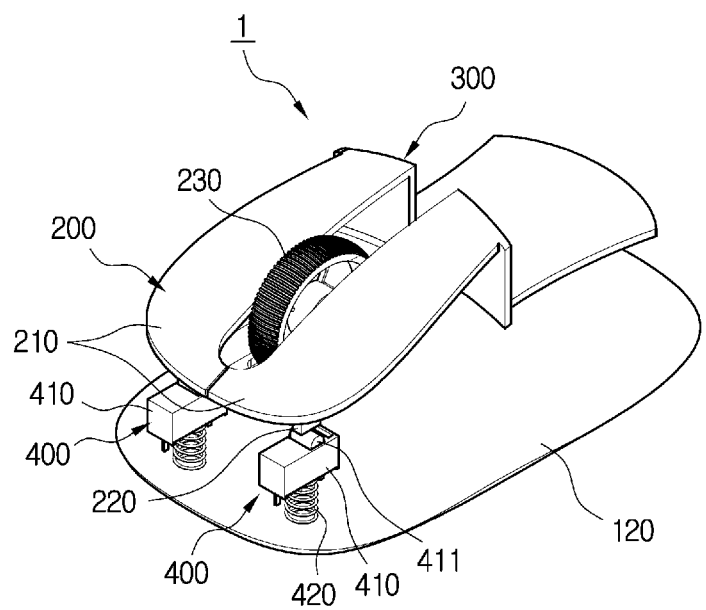
FIG. 3 is a perspective view of a switch unit according to a first embodiment of the present disclosure.
Figure 4:
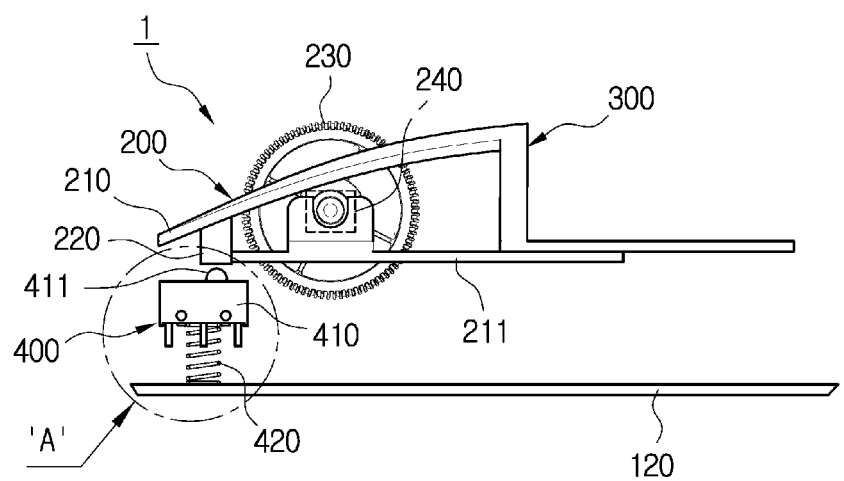
FIG. 4 is a side view of the switch unit according to the first embodiment of the present disclosure.

Referring to FIGS. 3 to 5, the switch unit 400 according to a first embodiment of the present disclosure may be constructed such that a mechanical microswitch 410 is applied thereto.

Specifically, the switch unit 400 according to the first embodiment may include the microswitch 410 equipped with a contact type button 411 which comes into contact with the bottom of the manipulation bar 220, lowered when the button unit 200 is clicked on, and is downward pressed, and an elastic member 420 interposed between the bottom of the microswitch 410 and a bottom within the main body unit 100 and configured to upward and elastically support the microswitch 410.

Figures 5A, 5B:
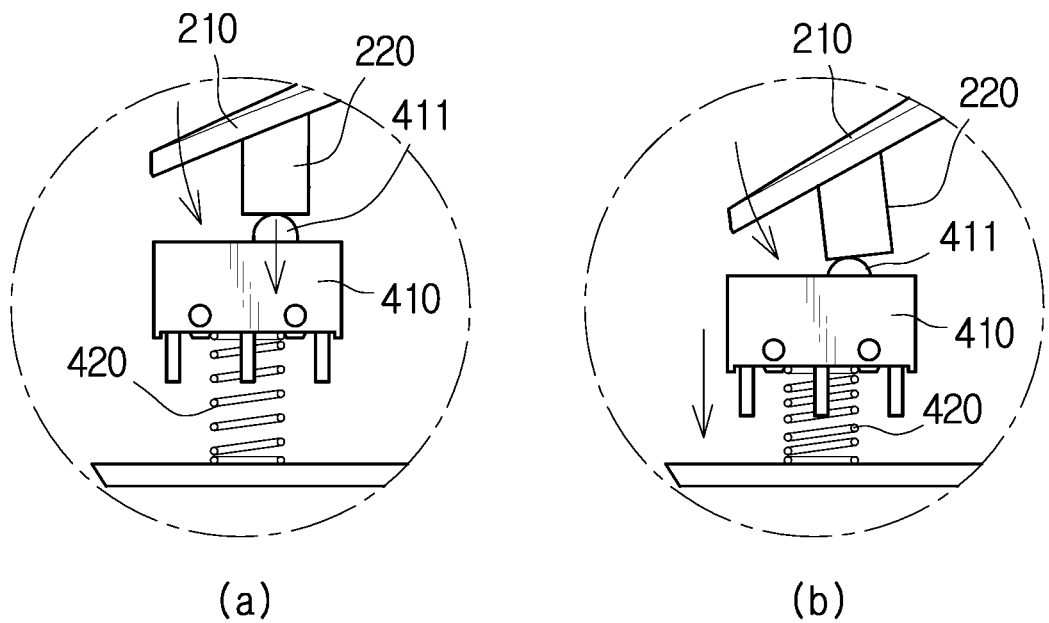
FIGS. 5A and 5B are detailed diagrams of a portion "A" in FIG. 4, illustrating an operating state of the switch unit according to the first embodiment of the present disclosure.

That is, the switch unit 400 is operated as the bottom of the manipulation bar 220 presses the contact type button 411 of the microswitch 410 when the button unit 200 is clicked on (refer to FIG. 5A). In this case, the microswitch 410 has a structure elastically supported by the elastic member 420. Accordingly, the contact type button 411 is pressed and subjected to an ON operation, and simultaneously the microswitch 410 is further pressed downward by a given depth (refer to FIG. 5B).

In other words, although the microswitch 410, that is, a contact point contact type, is provided in the switch unit 400, the elastic member 420 for upward and elastically supporting the microswitch 410 is provided. Thus, the button unit 200 can be prevented from being suddenly stopped when the button unit 200 is clicked on.

More specifically, actual numerical values are taken as an example with respect to an operation of the switch unit 400. A conventional button unit can move up and down within approximately 0.5 to 1 mm so that the button unit can operate the switch unit. That is, after the contact type button is subjected to an ON operation by clicking on the button unit by about 0.5 to 1 mm, the button unit is suddenly stopped by the microswitch fixed to the bottom surface of the main body unit.

In contrast, the button unit 200 applied to the switch unit 400 of the present disclosure has a maximum distance of 3 to 10 mm in which the button unit 200 can be raised or lowered when the button unit 200 is clicked on. Furthermore, an actual operating distance in which the switch unit 400 may be subjected to an ON operation by clicking on the button unit 200 is approximately 1 mm.

That is, after the switch unit 400 is subjected to an ON operation through clicking on the button unit 200, if a user does not stop clicking on the button unit 200, the switch unit 400 may further move downward by about 2 to 9 mm. By preventing the button unit 200 from being suddenly stopped as described above when the button unit 200 is clicked on, the fingers and wrist of a user can be protected.

Such a distance by which the button unit 200 is lowered may be identically applied to second to fourth embodiments of the switch unit 400 to be described later.

Figure 6:
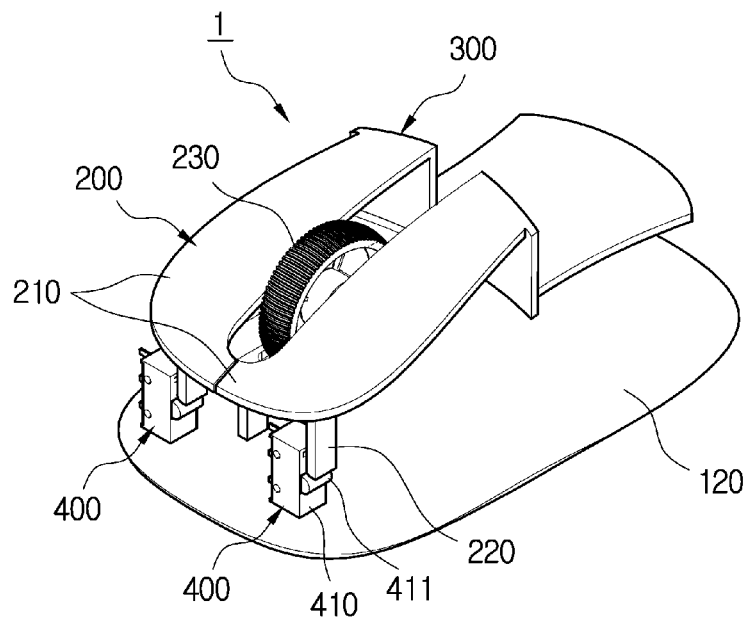
FIG. 6 is a perspective view of a switch unit according to a second embodiment of the present disclosure.

Referring to FIGS. 6 to 8, the switch unit 400 according to a second embodiment of the present disclosure includes the microswitch 410 equipped with the contact type button 411 which comes into sliding contact with an outer circumference surface on the lower side of the manipulation bar 220 lowered when the button unit 200 is clicked on, and is pressed in a horizontal direction orthogonal to a direction in which the manipulation bar 220 is lowered.

Specifically, the microswitch 410 constructing the switch unit 400 is fixedly installed on a bottom within the main body unit 100. The contact type button 411 has a rounded outer circumference surface (refer to FIG. 7). Accordingly, the bottom of the manipulation bar 220 lowered when the button unit 200 is clicked on can come into sliding contact with the front end of the contact type button 411.

That is, the contact type button 411 horizontally moves while coming into sliding contact with the manipulation bar 220 that downward moves. Accordingly, the state of a contact point within the microswitch 410 switches to an ON state (refer to FIG. 8A).

Simultaneously, the manipulation bar 220 may further move downward by a given depth even after the contact type button 411 horizontally moves and a state thereof becomes an ON state (refer to FIG. 8B).

An impact applied to the fingers and wrist of a user who manipulates the button unit 200 can be prevented because the manipulation bar 220 can further move downward by a given depth without being suddenly stopped as described above.

Figure 9:
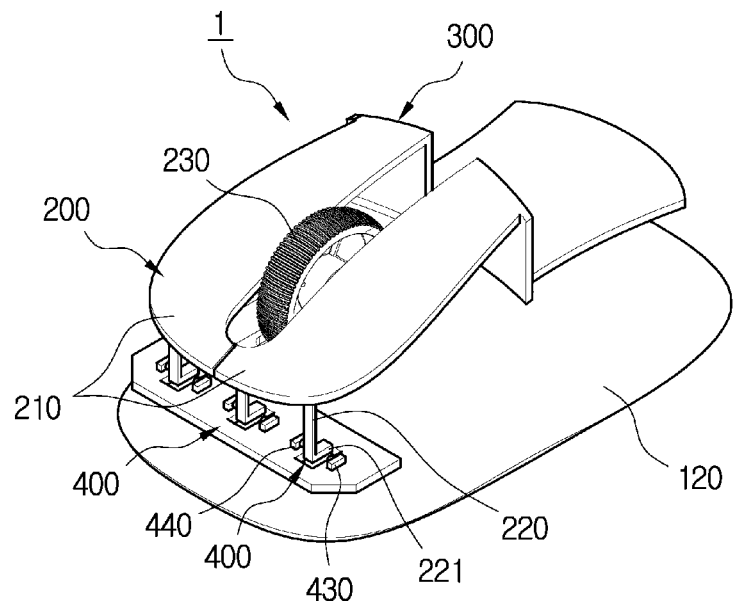
FIG. 9 is a perspective view of a switch unit according to a third embodiment of the present disclosure.
Figure 10:
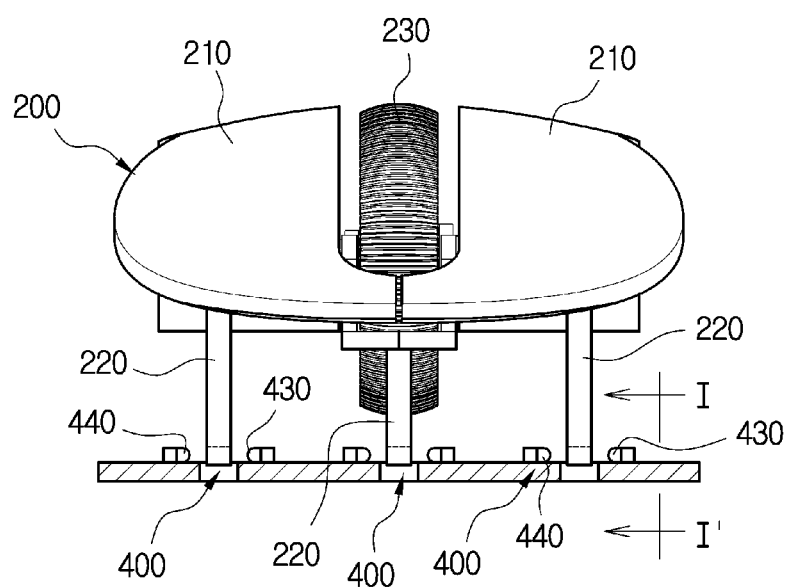
FIG. 10 is a front view of the switch unit according to the third embodiment of the present disclosure.

Referring to FIGS. 9 to 11, the switch unit 400 according to a third embodiment of the present disclosure may include an optical transmitter 430 configured to generate a light beam so that whether the manipulation bar 220 provided in the button unit 200 is lowered can be sensed, and an optical receiver 440 disposed to face the optical transmitter 430 and configured to receive the light beam generated by the optical transmitter 430.

Specifically, when the button unit 200 is not clicked on, an OFF state can be maintained because a covering member 221 disposed at the bottom of the manipulation bar 220 blocks a light beam between the optical transmitter 430 and the optical receiver 440. In this case, the covering member 221 may be disposed at the bottom of the manipulation bar 220 in a form bent in an "L" shape (refer to FIG. 11A).

Furthermore, when the button unit 200 is clicked on, the OFF state may be changed to an ON state because the blocking of the light beam between the optical transmitter 430 and the optical receiver 440 by the covering member 221 is released (refer to FIG. 11B).

That is, as the switch unit 400 is applied as the structure of the optical transmitter 430 and the optical receiver 440, a direct contact of the switch unit 400 with the button unit 200 can be blocked. Accordingly, a case where the button unit 200 is suddenly stopped upon operation can be fundamentally prevented.

In particular, the switch unit 400 never generates resistance according to a manipulation of the switch unit 400 other than a force that presses the button unit 200 when the switch unit 400 is subjected to an ON operation. Accordingly, the switch unit 400 can be smoothly manipulated.

Figure 13:
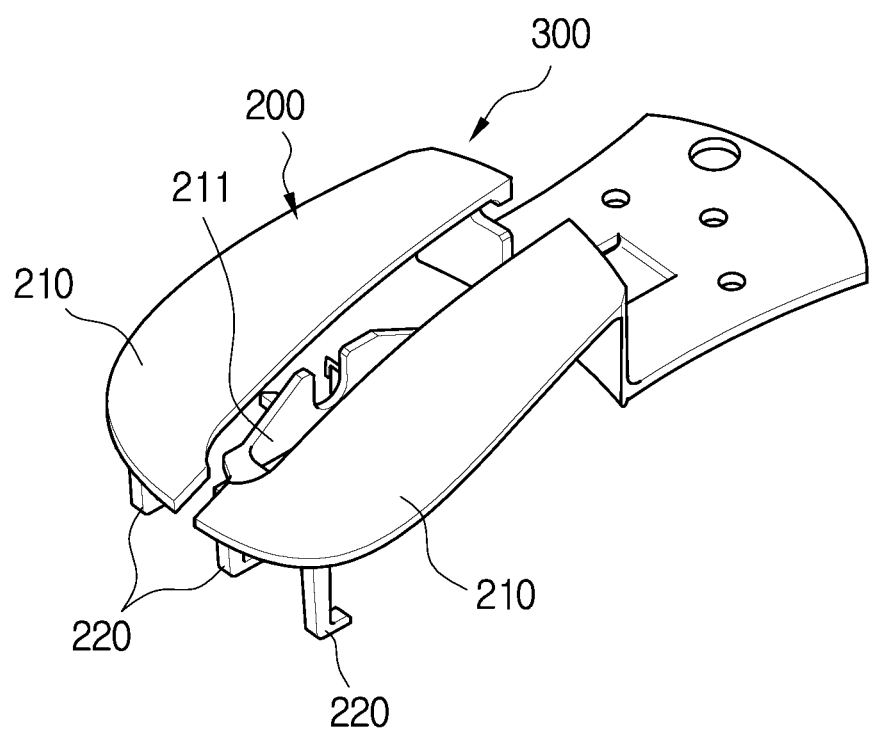

Referring to FIGS. 12 and 13, the button member 211 provided between the two button members 210 constructing the button unit 200 may be rotatably equipped with the mouse wheel 230.

Furthermore, the mouse wheel 230 may be equipped with the encoder 240 configured to sense the rotation of the mouse wheel 230.

Specifically, the encoder 240 may be coupled to the mouse wheel 230 so as to be raised or lowered integrally with the mouse wheel 230. Accordingly, when the mouse wheel 230 is clicked on, a distance in which the mouse wheel 230 is raised or lowered can be increased compared to a conventional mouse wheel.

That is, an encoder provided in the conventional mouse wheel has a construction fixed to a printed circuit board (PCB) fixedly installed at the bottom within the main body of a mouse. As described above, as the conventional encoder is fixed to the PCB, a movable range thereof is inevitably narrow when the mouse wheel is clicked on.

In contrast, the encoder 240 integrated with the button member 211 of the present disclosure may have a wider movable range than the conventional mouse wheel because the encoder 240 integrated with the button member 211 is raised or lowered when the button member 211 is clicked on.

In particular, as in the two button members 210, the manipulation bar 220 for operating the switch unit 400 is provided at the lower part of the button member 211 with which the mouse wheel 230 is integrated. Accordingly, when the mouse wheel 230 is clicked on, the encoder 240 can be further moved by a given depth in the state in which the switch unit 400 has been operated, and thus stress can be prevented from being applied to the fingers of a user.

In this case, any one of a mechanical type or an optical type may be applied to the encoder 240.

Figure 14:
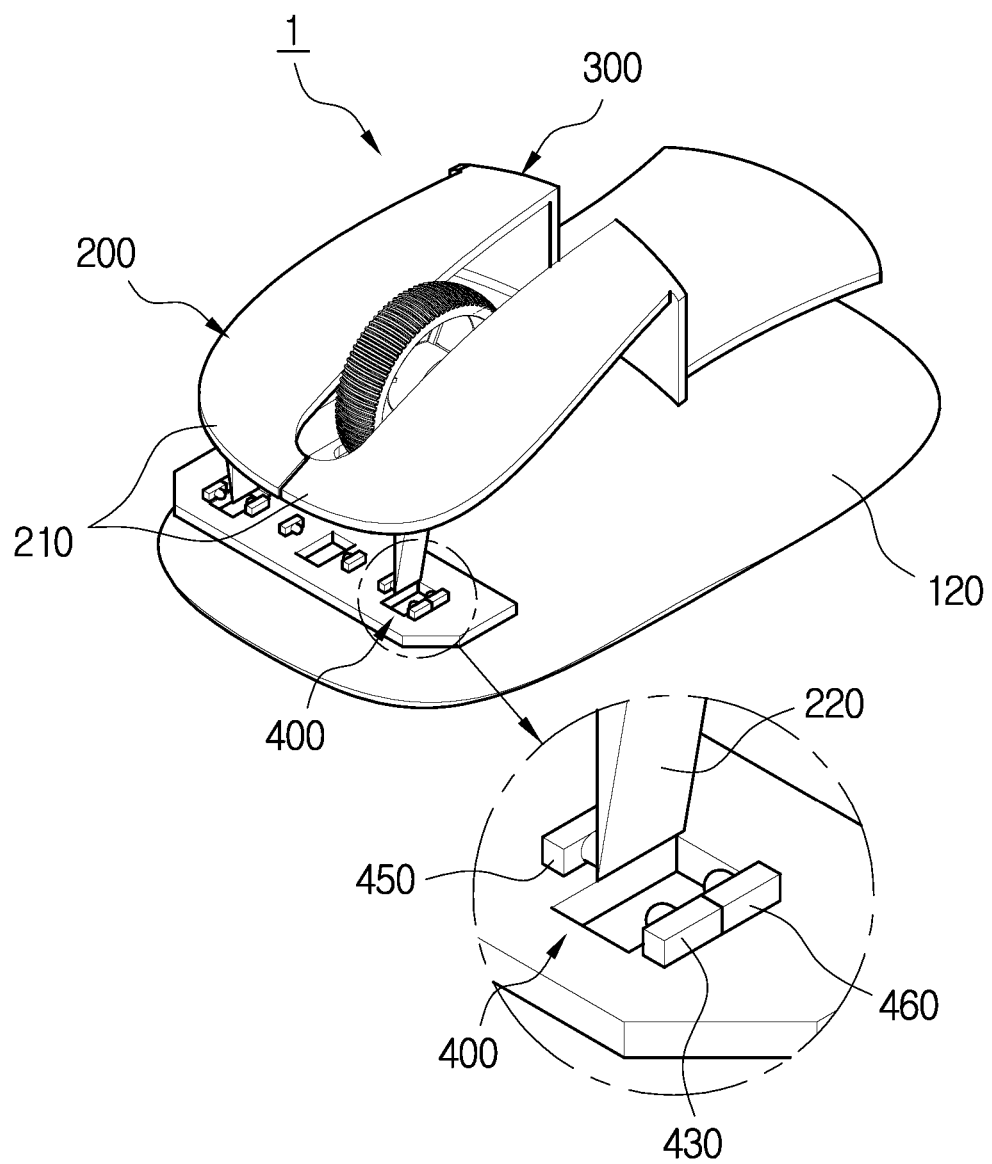
FIG. 14 is a perspective view and partial detailed diagram of a switch unit according to a fourth embodiment of the present disclosure.
Figure 15:
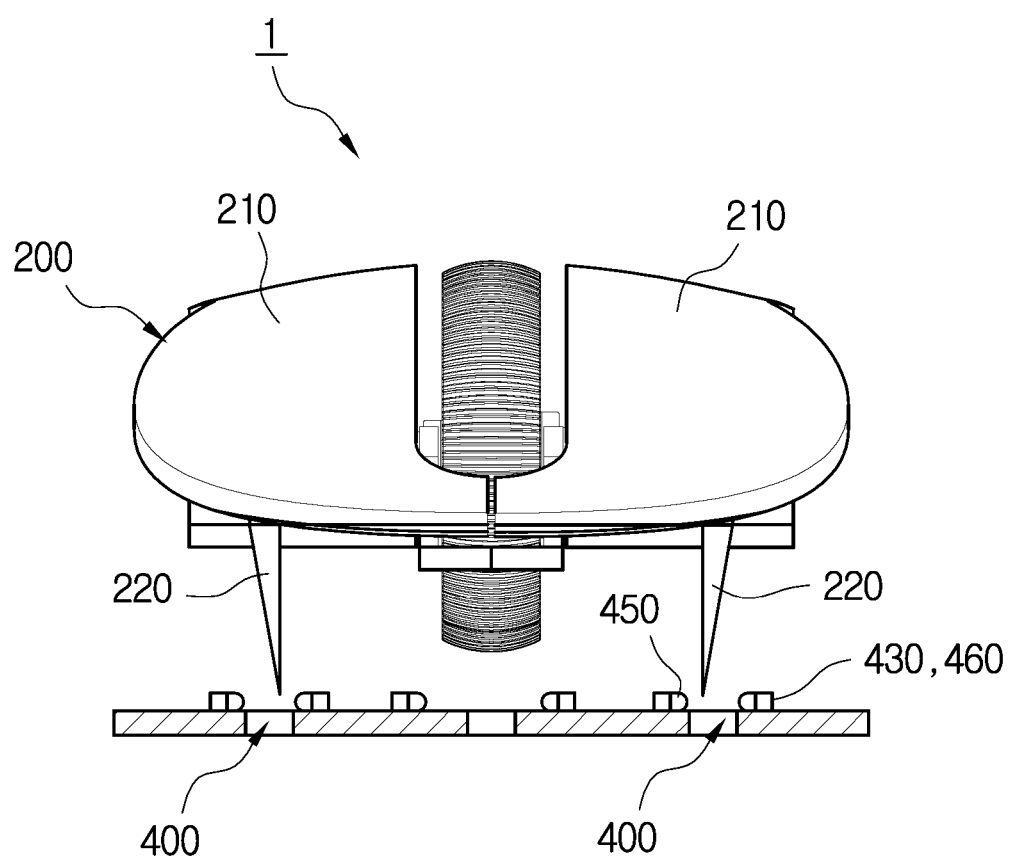
FIG. 15 is a front view of the switch unit according to the fourth embodiment of the present disclosure.

Referring to FIGS. 14 to 16, the switch unit 400 according to a fourth embodiment of the present disclosure may include the optical transmitter 430 configured to generate a light beam, a first optical receiver 450 disposed to face the optical transmitter 430, and a second optical receiver 460 disposed on one side of the optical transmitter 430.

Figure 16A:
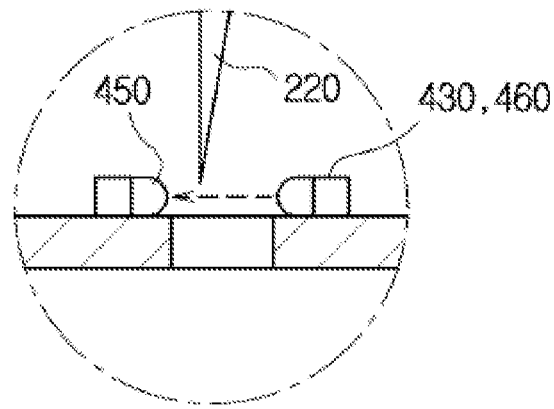
FIGS. 16A to 16C are operating state diagrams of the switch unit according to the fourth embodiment of the present disclosure.

Specifically, when the button unit 200 is not clicked on, the first optical receiver 450 may receive a light beam generated by the optical transmitter 430, thereby maintaining an OFF state (refer to FIG. 16A).

Figure 16B:
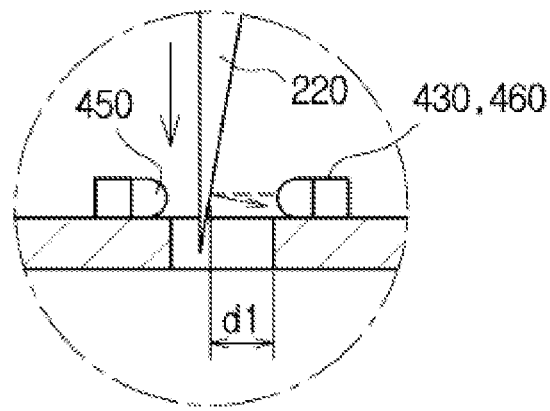

Furthermore, when the button unit 200 is clicked on, the lower end of the manipulation bar 220 blocks a light beam generated by the optical transmitter 430, thereby changing the OFF state to an ON state refer to FIG. 16B).

Figure 16C:
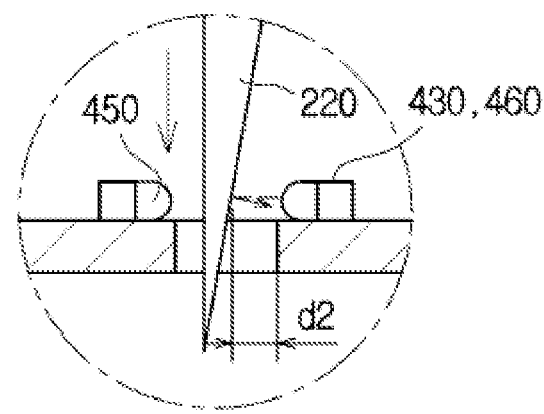

At the same time, a light beam reflected from a surface of the manipulation bar 220 that blocks the light beam is received by the second optical receiver 460 disposed on one side of the optical transmitter 430 (refer to FIG. 16C).

In this case, the manipulation bar 220 is formed in a wedge shape having a wide top and narrow bottom. Accordingly, the manipulation bar 220 converts, into a given signal, the amount of reflection of a light beam according to reflection distances d1 to d2 of the light beam, which are differently formed depending on a degree to which the manipulation bar 220 is lowered, through a control unit (not illustrated). Accordingly, the given signal may be used as analog input means on a computer display.

More specifically, a distance between the optical transmitter 430 and the second optical receiver 460 is changed depending on a degree to which the manipulation bar 220 having the wedge shape is lowered. As the distance is changed, the amount of a light beam that is generated by the optical transmitter 430 and then reaches the second optical receiver 460 is changed.

In this case, collector currents of the optical transmitter 430 and the second optical receiver 460 (e.g., Sharp GP2S700HCP Photo interrupter) are proportional to the distance up to approximately 3 mm. Accordingly, it is possible to know a distance between the manipulation bar 200 having the wedge shape, and the optical transmitter 430 and the second optical receiver 460 by measuring the collector currents of the optical transmitter 430 and the second optical receiver 460. Furthermore, it is possible to know a distance in which the manipulation bar 220 has been downward pressed. Accordingly, when a voltage proportional to the distance is measured and transmitted to a computer, the voltage may be used as analog input means within the computer.

For example, analog information through the analog input means may be used as a drawing tool including a pen, a paint brush, a calligraphy brush, etc. capable of expressing different thicknesses on a computer display.

A case where the switch unit 400 according to the fourth embodiment of the present disclosure includes the optical transmitter 430, the first optical receiver 450, and the second optical receiver 460 (three elements) is illustrated and described as an example, but the present disclosure is not limited thereto. The switch unit 400 according to the fourth embodiment may omit the first optical receiver 450 and include the optical transmitter 430 and the second optical receiver 460 which are disposed in parallel in an adjacent direction (two elements).

That is, if the switch unit 400 includes the optical transmitter 430 and the second optical receiver 460 (two elements), a light beam transmitted by the optical transmitter 430 cannot be reflected because the manipulation bar 220 has not been lowered when the button unit 200 is not clicked on.

Accordingly, the light beam transmitted by the optical transmitter 430 cannot reach the second optical receiver 460. In this case, the switch unit 400 is in an OFF state. In other words, the switch unit 400 may operate as a switch depending on whether the light beam reaches the second optical receiver 460.

For reference, a difference between the case where the switch unit 400 uses the three elements and the case where the switch unit 400 uses the two elements is the inversion of a signal. That is, basically, if the switch unit 400 includes the three elements, light initially reaches the first optical receiver 450 that determines the ON/OFF of the switch unit 400.

Furthermore, basically, if the switch unit 400 includes the two elements, a basis may be that light does not initially reach the second optical receiver 460 that determines the ON/OFF of the switch unit 400.

Figure 17:
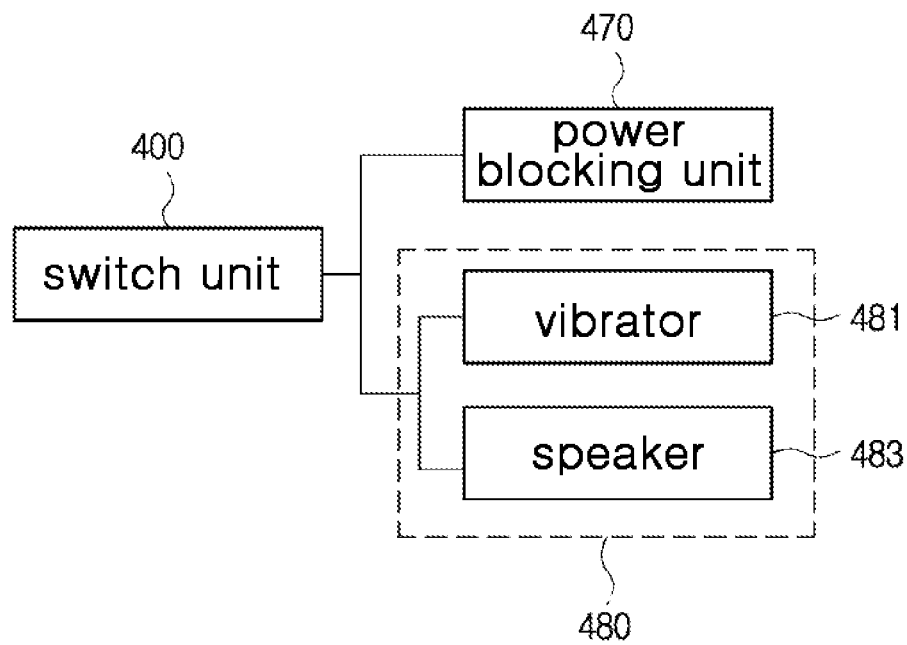
FIG. 17 is a schematic diagram illustrating the state in which a power blocking unit and an operation check unit are provided in the switch unit according to each of the third and fourth embodiments of the present disclosure.

As illustrated in FIG. 17, the switch unit 400 using a light beam may include a power blocking unit 470 configured to block the supply of power when the switch unit 400 is not used for a given time in order to reduce power consumption.

That is, the switch unit 400 using a light beam has a structure in which a light beam is always transmitted by the optical transmitter 430 although the input device 1 for a computer is not used.

In other words, electrical energy needs to be continuously supplied to the optical transmitter 430, and thus electrical energy may be wasted. Accordingly, in order to reduce the consumption of electrical energy by the switch unit 400, the supply of power may be blocked through the power blocking unit 470 when a user does not use the input device 1 for a computer for a given time.

Furthermore, when the user's attempt to use the input device 1 for a computer is sensed in the state in which the supply of power to the switch unit 400 has been blocked, power may be supplied to the optical transmitter 430 again so that the state of the switch unit 400 returns to an operable state.

Figure 18:
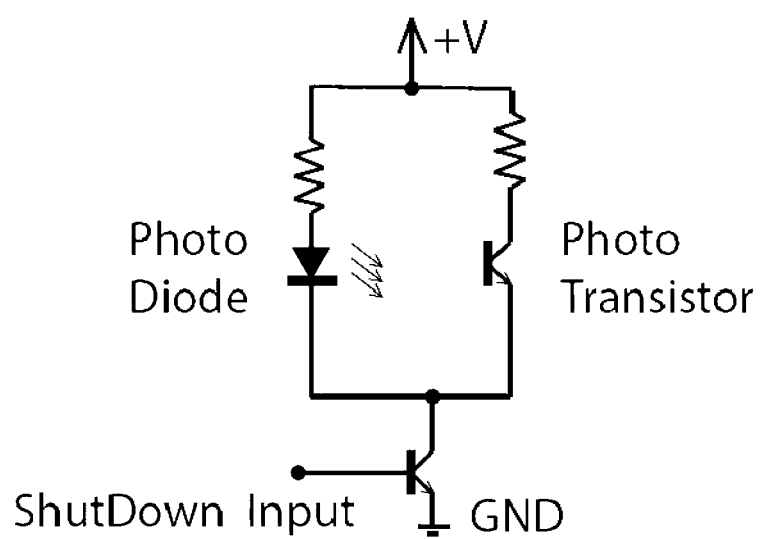
FIG. 18 is a circuit diagram that constitutes the power blocking unit of FIG. 17.

Such an automatic power saving function of the switch unit 400 using the power blocking unit 470 may be performed by using a circuit construction illustrated in FIG. 18. That is, if a user does not use the input device 1 for a computer for a given time, the control unit may apply a signal to "Shutdown Input" of the circuit so that the power saving function through the power blocking unit 470 is operated.

Furthermore, the switch unit 400 using a light beam may include an operation check unit 480 configured to generate vibration in order for a user to easily check an ON/OFF operation when the switch unit 400 is subjected to the ON/OFF operation in response to clicking on the button unit 200.

In this case, a vibrator 481 may be used for the vibration generated by the operation check unit 480.

That is, it is difficult to know an ON/OFF operation of the switch unit 400 based on only a feeling of the hand because the switch unit 400 using a light beam requires a minimum force of the hand when the switch unit 400 is used.

Accordingly, whether the switch unit 400 is operated can be easily checked by generating minute vibration through the vibrator 481 of the operation check unit 480 when the switch unit 400 is subjected to an ON/OFF operation.

In this case, the operation check unit 480 may display, in the form of a specific sound in addition to vibration, whether the switch unit 400 is subjected to an ON/OFF operation, through a separate speaker 483 provided within the main body unit 100.

Whether vibration or a sound is generated through the operation check unit 480 may be selectively set depending on a user's taste.

In the input device 1 for a computer having the aforementioned construction according to the present disclosure, the manipulation bar 220 can further move downward by a given depth without being suddenly stopped even after the manipulation bar 220 performs an ON operation on the switch unit 400 according to any one of the first and fourth embodiments when the button unit 200 is clicked on.

Accordingly, an impact can be prevented from being applied to the fingers and wrist of a user who clicks on the button unit 200. Accordingly, the fingers and the wrist can be protected because a tension does not occur in a hand that holds the input device 1.

Specific detailed embodiments of the present disclosure have been illustrated and described, but the present disclosure is not limited to the embodiments and may be variously modified and changed without departing from the technical spirit of the present disclosure.

Figure 19:
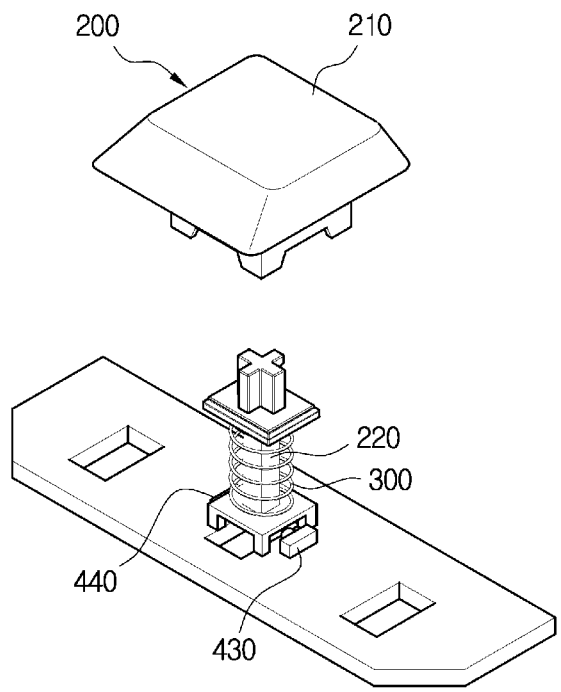
FIGS. 19, 20A and 20B are diagrams illustrating an input device for a computer according to a fifth embodiment of the present disclosure.
Figures 20A, 20B:
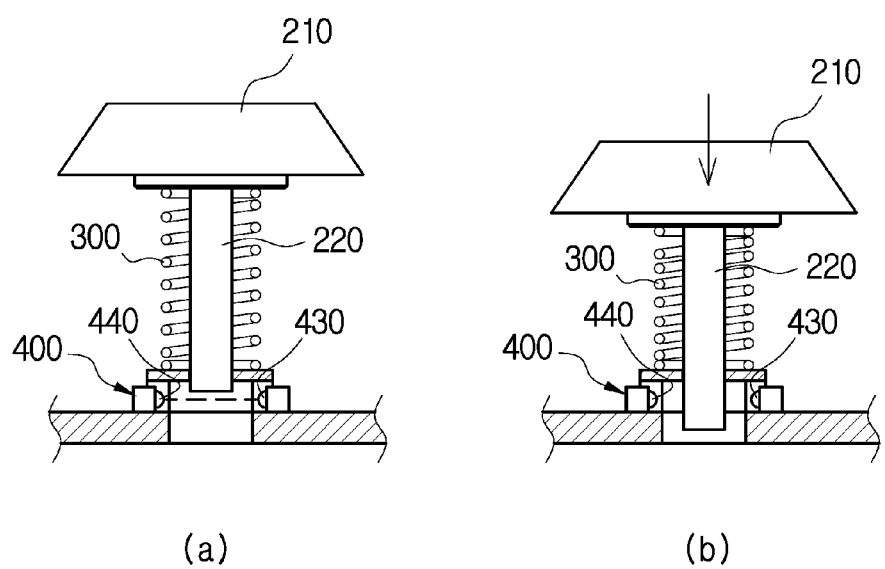
Figure 21:
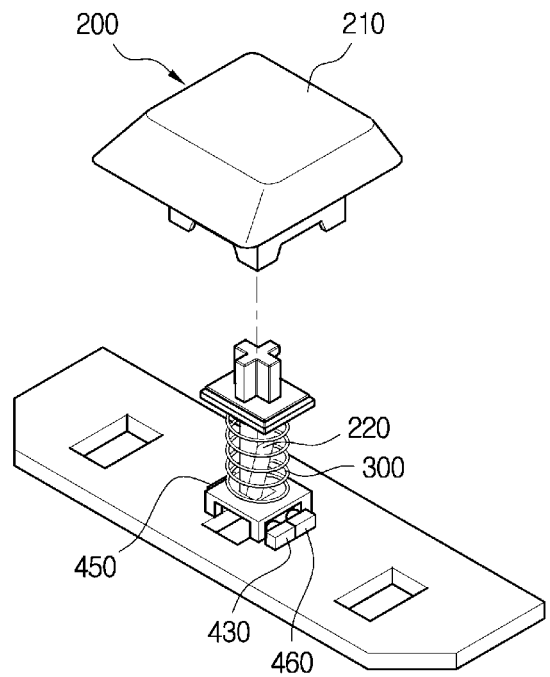
FIGS. 21, 22A and 22B are diagrams illustrating an input device for a computer according to a sixth embodiment of the present disclosure.

In particular, in the present disclosure, a case where the input device 1 for a computer has been applied to a mouse has been illustrated and described as an example, but the present disclosure is not limited thereto. As in fifth and sixth embodiments illustrated in FIGS. 19 to 21, the input device 1 for a computer may be applied to a keyboard.

Figures 22A, 22B:
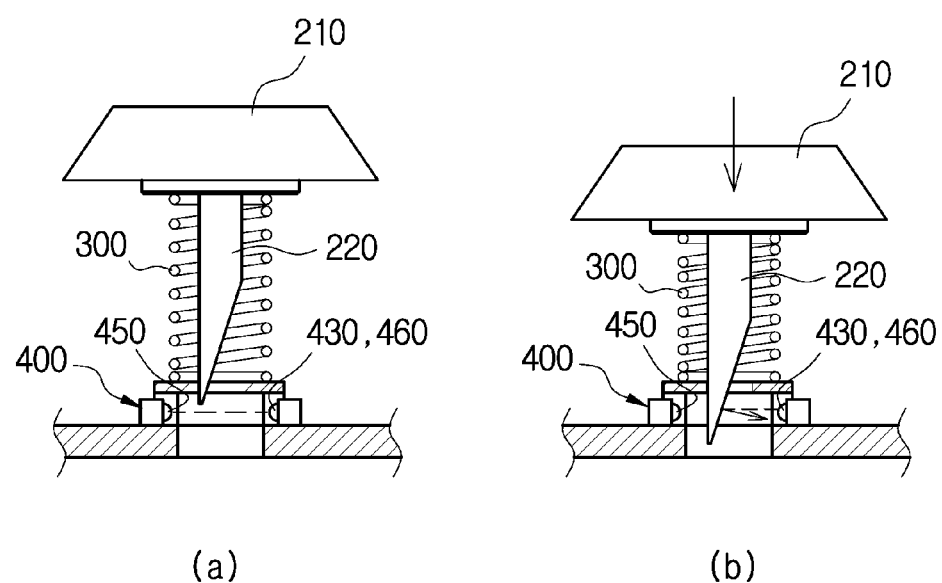

In this case, the structure including the optical transmitter 430 and the optical receiver 440 (refer to FIGS. 19 and 20) disclosed in the third embodiment may be applied to the switch unit 400 that is subjected to an on/off operation in response to clicking on the button unit 200 constructing the keyboard, or the structure including the optical transmitter 430 and the first and second optical receivers 450 and 460 (refer to FIGS. 21 and 22) disclosed in the fourth embodiment may be applied to the switch unit 400.

As another embodiment, the input device 1 for a computer according to the present disclosure may be applied to the button unit provided in a joystick (not illustrated).

Furthermore, the joystick held by a user may be configured to be clickable up and down in order for the switch unit 400 provided under the joystick to be subjected to an ON/OFF operation through clicking on the joystick. Accordingly, various functions can be performed.

Figure 23:
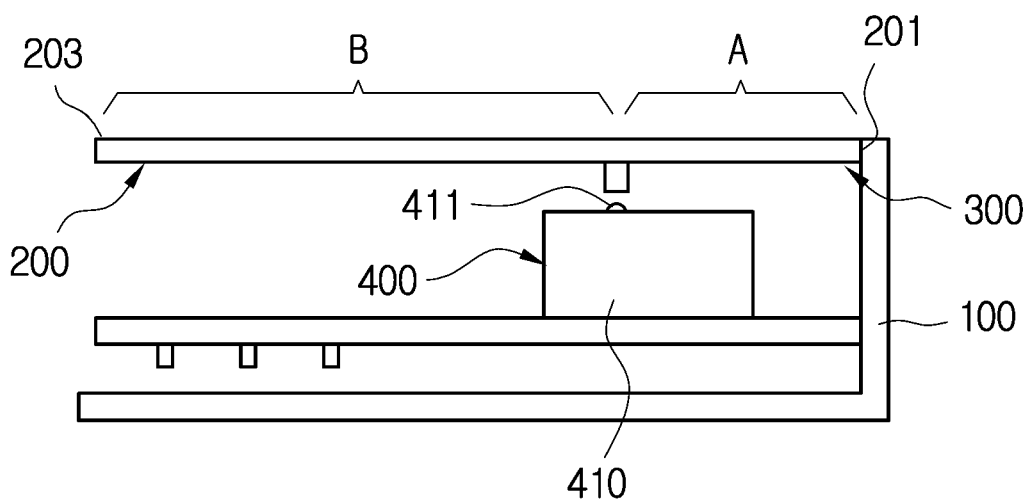
FIG. 23 is a schematic side view illustrating an input device for a computer according to a seventh embodiment of the present disclosure.
Figure 24:
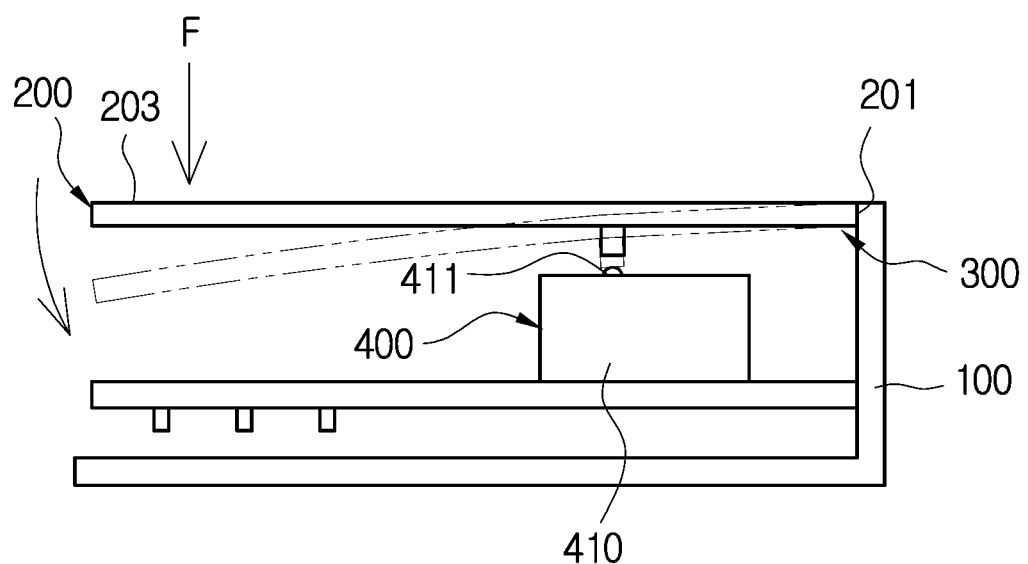
FIG. 24 is a side view illustrating an operating state of the input device for a computer according to the seventh embodiment of the present disclosure.

FIG. 23 is a schematic side view illustrating an input device for a computer according to a seventh embodiment of the present disclosure. FIG. 24 is a side view illustrating an operating state of the input device for a computer according to the seventh embodiment of the present disclosure.

Referring to FIGS. 23 and 24, the input device for a computer according to the seventh embodiment of the present disclosure may include the main body unit 100, the button unit 200, the elastic unit 300, and the switch unit 400.

First, the button unit 200 is provided over the main body unit 100 so as to be clickable, and may ON/OFF operate the switch unit 400 to be described later depending on whether the button unit 200 is clicked on.

Specifically, the button unit 200 may be formed in the form of a cantilever whose one side is a fixed stage 201 and the other side is a free stage 203 disposed to be turned around the fixed stage 201 up and down.

An operation of the button unit 200 is specifically described along with the switch unit 400 to be described later.

The elastic unit 300 functions to restore the button unit 200 to its original state when clicking on the button unit 200 is released.

Specifically, the elastic unit 300 may use the elastic restoring force of the button unit 200 having a cantilever shape. The button unit 200 is preferably made of a synthetic resin material so that the elastic unit 300 can efficiently generate the elastic restoring force.

The switch unit 400 is provided within a receiving space of the main body unit 100, and is subjected to an ON/OFF operation depending on whether the button unit 200 is clicked on.

Specifically, the switch unit 400 may be constructed such that where the microswitch 410 including the contact type button 411, which comes into contact with the lower end (bottom) of the button unit 200 and is downward pressed when the button unit 200 is clicked on, is applied thereto.

Such a switch unit 400 may be disposed between the fixed stage 201 of the button unit 200 and the free stage 203 of the button unit 200, which is a point clicked on with a finger. Accordingly, when the button unit 200 is clicked on, the button unit 200 may further move by a given depth in the state in which the switch unit 400 maintains an ON operation after being subjected to the ON operation.

The button unit 200 may include a first section A, that is, isolated distance between the fixed stage 201 and the contact type button 411, and a second section B, that is, an isolated distance between the, the contact type button 411 and the free stage 203 (refer to FIG. 23). In this case, the second section B may be formed to be longer than the first section A.

That is, the button unit 200 having a cantilever shape may change a function characteristic of a force F (refer to FIG. 24) pressed by a hand and a distance in which the free stage 203 of the button unit 200 moves, depending on stiffness in the first section A and the second section B.

Referring to FIG. 25, a case where stiffness in the first section A is small, a case where stiffness in the second section B is small, etc. may be considered for the button unit 200. That is, given stiffness may be imparted to the button unit 200 by applying different thicknesses to the first section A and the second section B.

Figure 25A:
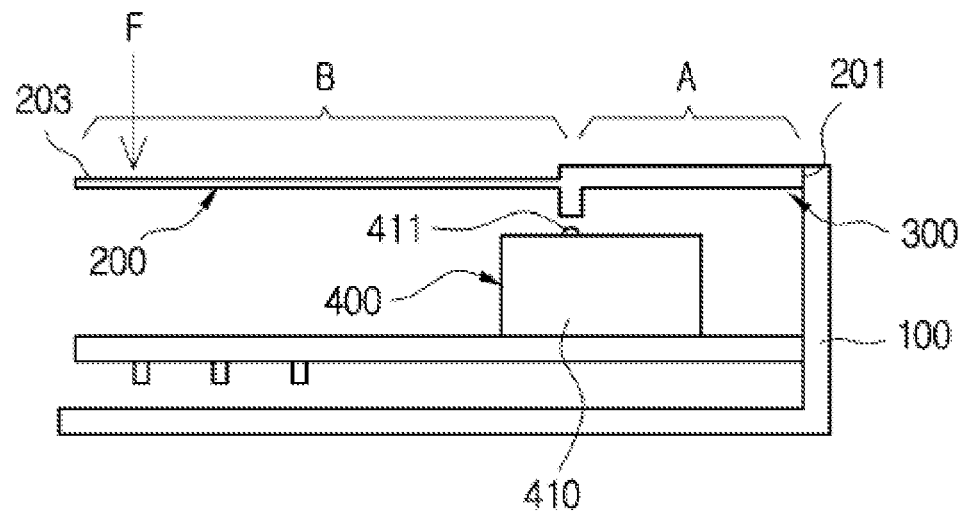
FIGS. 25A and 25B are side views illustrating various embodiments of a button unit according to the seventh embodiment of the present disclosure.

Specifically, FIG. 25A is a case where stiffness in the second section B is smaller than that in the first section A. In this case, if the force F is applied to the free stage 203 of the button unit 200, the second section B is first bent downward before the contact type button 411 of the switch unit 400 is operated.

That is, a user may operate the switch unit 400 only when moving, up to a given depth, the fingers of the user that click on the button unit 200. In other words, in this case, a response speed of the input device for a computer becomes slow.

Figure 25B:
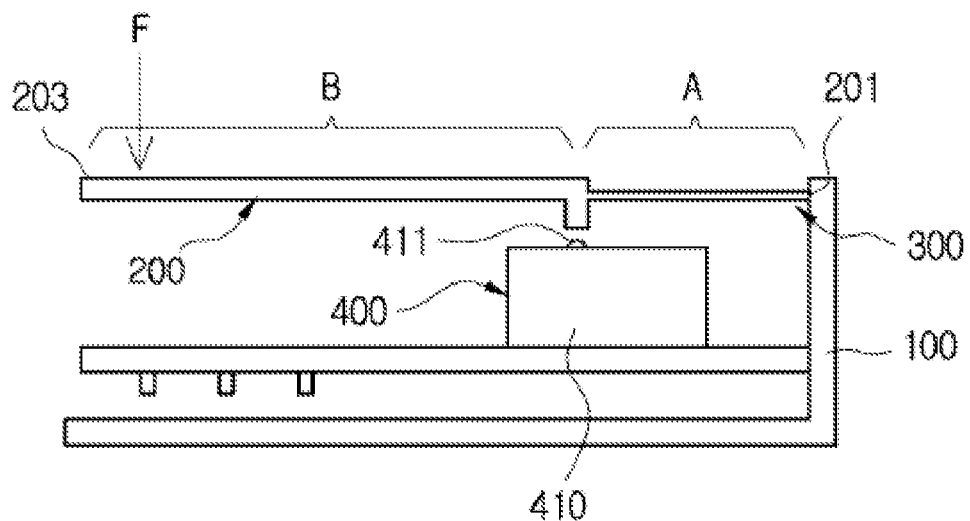

FIG. 25B is a case where stiffness in the first section A is smaller than that in the second section B. In this case, if the force F is applied to the free stage 203 of the button unit 200, the second section B in which stiffness is great is not bent. The switch unit 400 is operated even through a finger pressing the free stage 203 is slightly moved. After the switch unit 400 is operated, the first section A is bent, and thus the finger may continue to be pressed.

That is, if the button unit 200 is first clicked on by applying the force F to the free stage 203 of the button unit 200, the button unit 200 may be downward rotated using the fixed stage 201 as a hinge axis, and may be clicked on in the state in which stiffness is small.

Furthermore, after the contact type button 411 of the switch unit 400 is pressed by the downward rotation of the button unit 200 and is subjected to an ON operation, the second section B in the button unit 200 is downward rotated using the ON-operated contact type button 411 as a hinge axis. At this time, the second section B is not bent and the first section A serves as a spring while being bent like a bow.

As described above, stiffness of the button unit 200 is changed after and before the switch unit 400 is operated. Accordingly, the button unit 200 can be clicked on with a small force before the switch unit 400 is operated.

That is, the switch unit 400 can be operated even in a situation in which a moving distance of a finger that clicks on the button unit 200 is relatively short.

Furthermore, after the switch unit 400 is operated, the button unit 200 can be downward rotated only when a greater force is gradually applied to the button unit 200 compared to before the switch unit 400 is operated.

In other words, after the switch unit 400 is subjected to an ON operation, a greater force is necessary to click on the button unit. Accordingly, an impact occurring when the button unit 200 touches a bottom can be prevented.

Furthermore, a force that clicks on the switch unit 400 can be reduced because the principle of a lever is applied by a ratio between the entire length of the button unit 200 and the first section A. For example, if a key force that presses the switch unit 400 is about 50 gf to 100 gf and a ratio between the entire length of the button unit 200 and the first section A is 3:1, the switch unit 400 can be clicked on with the force F of ⅓ by using the button unit 200.

That is, a force applied to a hand at the early stage of clicking on the button unit 200 may be the sum of a force based on stiffness in the first section A and the key force ⅓ of the microswitch 410. Accordingly, if stiffness in the first section A is small, the microswitch 410 can be operated with only a very small force.

Although a relatively great force is necessary to click on the button unit 200 due to stiffness in the second section B after the microswitch 410 is subjected to an ON operation, such a structure can prevent the free stage 203 of the button unit 200, further clicked on by a given depth after the switch unit 400 is subjected to the ON operation, from being bumped against the bottom.

Figure 26:
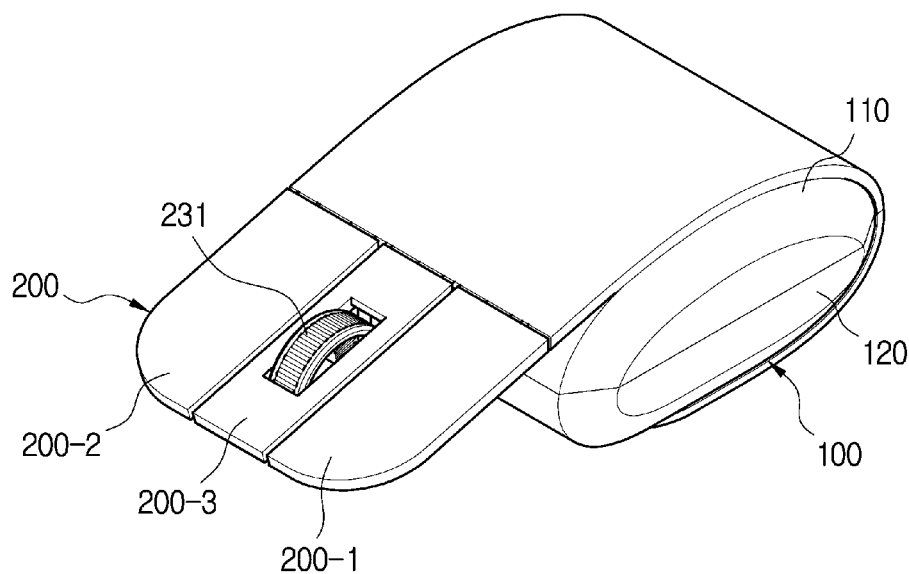
FIG. 26 is a perspective view illustrating an embodiment of a product fabricated by applying an operating principle of the input device for a computer according to the seventh embodiment of the present disclosure.
Figure 27:
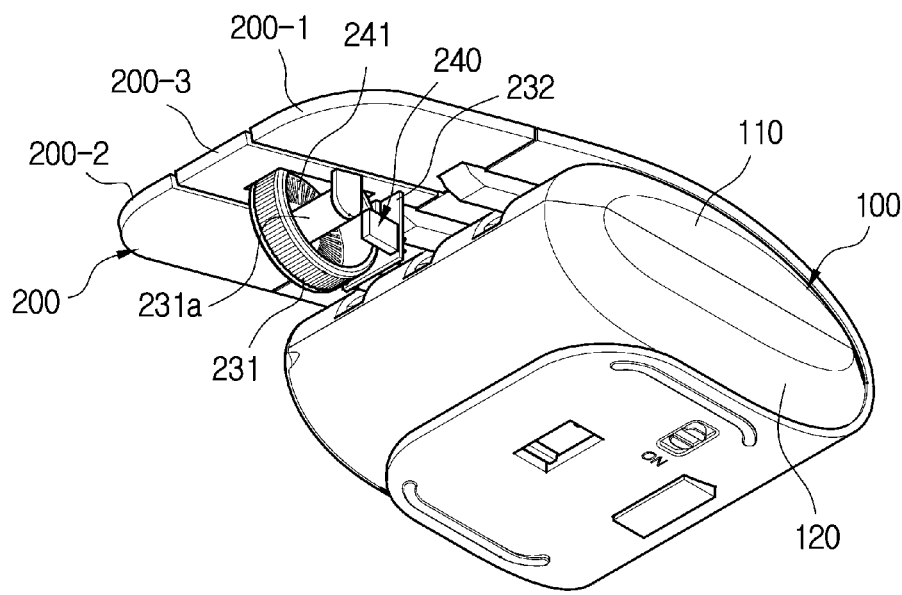
FIG. 27 is a bottom perspective view of FIG. 26.
Figure 28:
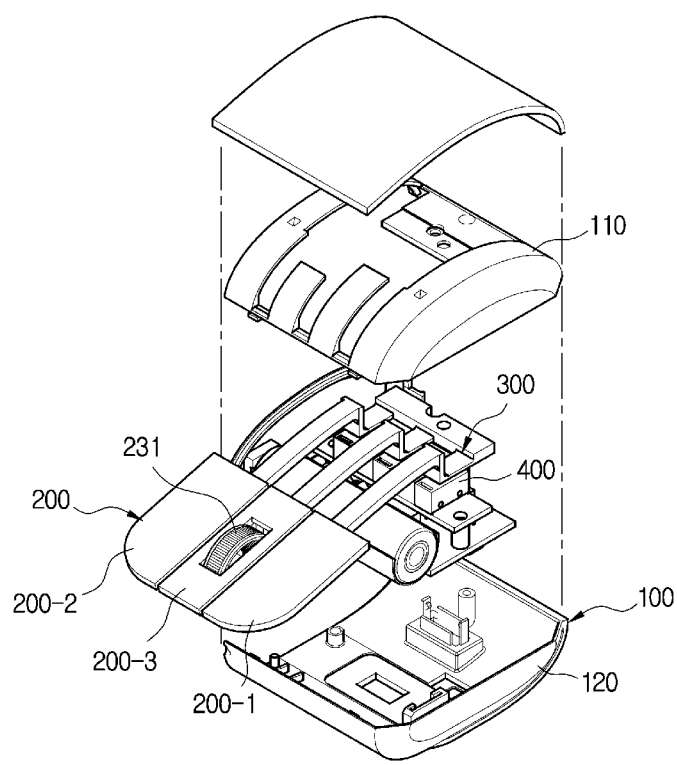
FIG. 28 is an exploded perspective view of FIG. 26.

FIG. 26 is a perspective view illustrating an embodiment of a product fabricated by applying an operating principle of the input device for a computer according to the present disclosure. FIG. 27 is a bottom perspective view of FIG. 26. FIG. 28 is an exploded perspective view of FIG. 26.

Referring to FIGS. 26 to 28, a plurality of button units 200 may be provided at the top of the main body unit 100 of the input device for a computer. The button units 200 may include a left button 200-1, a right button 200-2 disposed on the right side of the left button 200-1 in parallel thereto, and a middle wheel button 200-3 disposed between the left button 200-1 and the right button 200-2 in parallel thereto.

In this case, a wheel member 231 capable of performing a scroll function for scrolling a document, etc. on a computer monitor may be integrated with the middle wheel button 200-3.

Specifically, the wheel member 231 may be installed to be rotatable through a rotation shaft 231a within an installation hole formed near the free stage 203 of the middle wheel button 200-3 (refer to FIG. 27).

Furthermore, the encoder 240 for sensing the rotation of the wheel member 231 may be integrated with one side of the wheel member 231.

As described above, since the encoder 240 is integrated with one side of the wheel member 231, the encoder 240 integrated with the wheel member 231 may be raised or lowered when the middle wheel button 200-3 is clicked on. Accordingly, a movable range thereof can be widened compared to a conventional mouse wheel.

The encoder 240 integrated with one side of the wheel member 231 is specifically described. First, a plurality of optical slits 241 may be radially formed around the rotation shaft 231a so as to penetrate the body of the wheel member 231.

Figure 29:
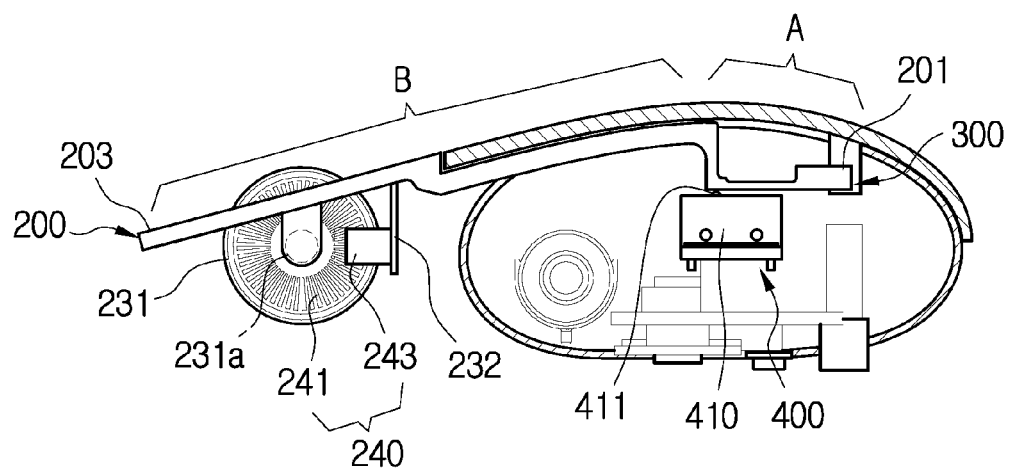
FIG. 29 is a lateral cross-sectional view illustrating an internal structure of FIG. 26.
Figure 30:
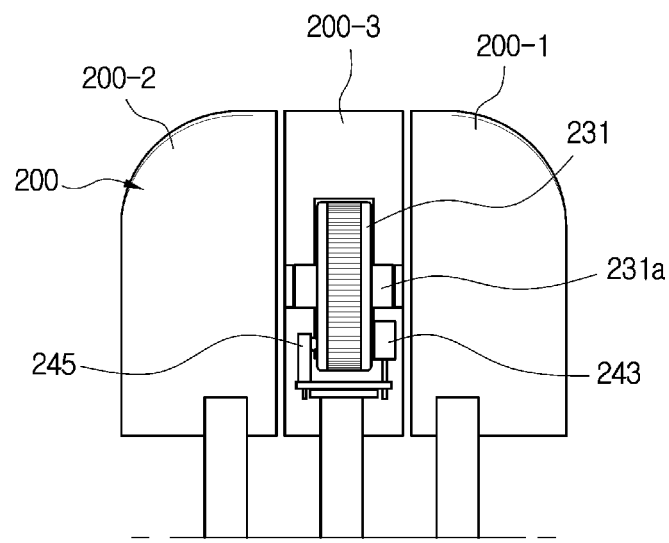
FIG. 30 is a partial detailed diagram illustrating the bottom of the button unit of FIG. 26.

Furthermore, as illustrated in FIGS. 29 and 30, an optical transmitter 243 and an optical receiver 245 may be provided under the middle wheel button 200-3. The optical transmitter 243 is isolated from the wheel member 231 through a support 232 on one side of the wheel member 231 and generates a light beam and the optical receiver 245 is installed to face the optical transmitter 243 through the support 232 on the other side of the wheel member 231 and receives a light beam passing through the optical slits 241 after being generated by the optical transmitter 243.

As described above, since the principle of the encoder 240 is a known technology which senses the rotation of the wheel member 231 to enable information on the rotation of the wheel member 231 to reach the optical receiver 245 so that a corresponding function can be performed, a detailed operating principle thereof is omitted herein.

The middle wheel button 200-3 having such a structure may perform two functions for rotating the wheel member 231 and clicking on the microswitch 410.

In this case, in the present disclosure, a case where the encoder 240 provided on one side of the wheel member 231 has been constructed as an optical type including the optical slits 241, the optical transmitter 243, and the optical receiver 245 has been illustrated and described as an example, but the present disclosure is not limited thereto. The encoder may be constructed as a mechanical type.

The middle wheel button 200-3 can prevent a malfunction of the switch unit 400 only when the middle wheel button 200-3 is not clicked on when the wheel member 231 is rotated.

In order to prevent the malfunction, the first section A of the middle wheel button 200-3 may have a thickness greater than those of the left and right buttons 200-1 and 200-2 so as to increase stiffness. Accordingly, if the wheel member 231 is rotated, the middle wheel button 200-3 can be prevented from being clicked on.

As another method, the wheel member 231 is rotatably coupled to the rotation shaft 231a, but a friction force between the holes of the wheel member 231 fitted into the rotation shaft 231a can be minimized. Accordingly, since the wheel member 231 can be rotated with a small force, the middle wheel button 200-3 can be prevented from being clicked on.

Figure 31:
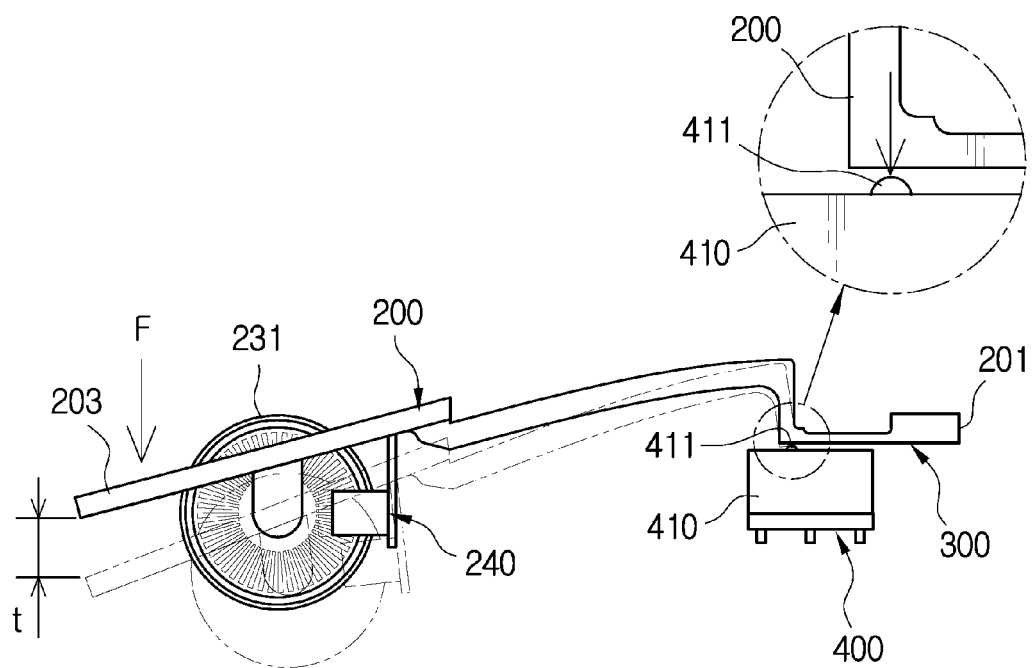
FIG. 31 is an operating state diagram of FIG. 26.

In the input device for a computer having such a construction according to the present disclosure, as in FIG. 31, when the button unit 200 is clicked on, the button unit 200 can further move downward by a given depth "t" without being suddenly stopped even after the switch unit 400 is subjected to an ON operation.

Accordingly, an impact is prevented from being applied to the fingers and wrist of a user who clicks on the button unit 200. Accordingly, the fingers and the wrist of the user can be protected because a tension does not occur in a hand that holds the input device for a computer.

Furthermore, since different stiffnesses are applied to the first section A and the second section B (refer to FIG. 29) of the button unit 200, a greater force is required to click on the button unit 200 after the switch unit is subjected to an ON operation. Accordingly, an impact occurring when the button unit 200 is bumped against a bottom can be prevented.

The invention claimed is:

1. An input device for a computer, comprising:
a main body unit having a receiving space provided therein;
a button unit provided to a top of the main body unit so as to be clickable;
an elastic unit configured to restore the button unit to its original state when clicking on the button unit is released; and
a switch unit provided within the receiving space and subjected to an ON operation or an OFF operation depending on whether the button unit is clicked on,
wherein the button unit further moves by a given depth in a state in which the switch unit maintains the ON operation after being subjected to the ON operation,
wherein a manipulation bar for ON/OFF operating the switch unit protrudes downward on an inner circumference surface of the button unit,
wherein the switch unit comprises an optical transmitter configured to generate a light beam and a first optical receiver disposed to face the optical transmitter and configured to receive the light beam generated by the optical transmitter, wherein when the button unit is not clicked on, the first optical receiver maintains an OFF state by receiving the light beam generated by the optical transmitter, and when the button unit is clicked on, a lower end of the manipulation bar blocks the light beam so that the OFF state is charged to an ON state,
wherein the switch unit further comprises a second optical receiver disposed on one side of the optical transmitter and configured to receive a light beam of the optical transmitter which is reflected from a surface of the manipulation bar at a moment when the lower end of the manipulation bar changes the OFF state to the ON state by blocking the light beam between the optical transmitter and the first optical receiver when the button unit is clicked on,
wherein the manipulation bar is formed in a wedge shape having a wide top and narrow bottom, and converts, into a given signal, an amount of reflection of a light beam according to reflection distances of the light beam, differently formed depending on a degree to which the manipulation bar is lowered, through a control unit, and
the given signal is used as analog input means within a computer.

2. The input device of claim 1, wherein:
the main body unit includes an upper casing and a lower casing separated from and assembled to each other, and
the button unit is formed by cutting a part of the upper casing or a separate button member is coupled to an opening of the upper casing.

3. The input device of claim 1, wherein the elastic unit uses an elastic restoring force of the button unit formed in a cantilever shape.

4. The input device of claim 1, wherein analog information through the analog input means is used as a drawing tool comprising a pen, a paint brush or a calligraphy brush capable of expressing different thicknesses on a computer display.

5. The input device of claim 1, wherein at least one of a plurality of button members constituting the button unit comprises:
a mouse wheel rotatably coupled to the at least one button member; and
an encoder configured to sense the rotation of a wheel member,
wherein the button member equipped with the mouse wheel and the encoder are integrally raised or lowered.

6. An input device for a computer, comprising:
a main body unit having a receiving space provided therein;
a button unit provided at a top of the main body unit so as to be clickable;
an elastic unit configured to restore the button unit to its original state when clicking on the button unit is released; and
a switch unit provided within the receiving space and subjected to an ON operation or an OFF operation depending on whether the button unit is clicked on,
wherein the button unit further moves by a given depth in a state in which the switch unit maintains the ON operation after being subjected to the ON operation,
wherein the button unit is formed in a shape whose one side is a fixed stage and another side is a free stage and the switch unit is disposed between the fixed stage of the button unit and the free stage of the button unit, which is a point clicked on with a finger,
wherein the switch unit is a microswitch equipped with a contact type button which comes into contact with a bottom of the button unit when the button unit is clicked on and is downward pressed,
wherein the button unit comprises:
a first section which is an isolated distance between the fixed stage and the contact type button; and
a second section which is an isolated distance between the contact type button and the free stage, and
wherein the second section is formed to be longer than the first section.

7. The input device of claim 6, wherein given stiffness is imparted to the button unit by applying different thicknesses to the first section and the second section.

8. The input device of claim 6, wherein the button unit comprises:

a left button;

a right button disposed on a right side of the left button in parallel thereto; and a middle wheel button disposed between the left button and the right button in parallel thereto.

9. The input device of claim 8, wherein the middle wheel button comprises:

a wheel member installed to be rotatable through a rotation shaft within an installation hole formed near the free stage and having a plurality of optical slits radially formed around the rotation shaft and penetrating the wheel member;

an optical transmitter installed at a bottom of the middle wheel button, disposed on one side of the wheel member so as to be isolated from the wheel member, and configured to generate a light beam; and an optical receiver installed at the bottom of the middle wheel button, disposed on another side of the wheel member so as to face the optical transmitter, and configured to receive a light beam passing through the optical slits after being generated by the optical transmitter.

10. The input device of claim 8, wherein the first section of the middle wheel button has a thickness greater than those of the left button and the right button in order to have stiffness greater than those of the left button and the right button.

\* \* \* \* \*